US009811760B2

(12) United States Patent
Richardson et al.

(10) Patent No.: US 9,811,760 B2
(45) Date of Patent: Nov. 7, 2017

(54) ONLINE PER-FEATURE DESCRIPTOR CUSTOMIZATION

(71) Applicants: Ford Global Technologies, LLC, Dearborn, MI (US); The Regents of the University of Michigan, Ann Arbor, MI (US)

(72) Inventors: Andrew Richardson, Ann Arbor, MI (US); Edwin Olson, Ann Arbor, MI (US)

(73) Assignees: FORD GLOBAL TECHNOLOGIES, LLC, Dearborn, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 118 days.

(21) Appl. No.: 14/814,630

(22) Filed: Jul. 31, 2015

(65) Prior Publication Data
US 2017/0032217 A1    Feb. 2, 2017

(51) Int. Cl.
| G06K 9/46 | (2006.01) |
| G06K 9/62 | (2006.01) |
| G06K 9/48 | (2006.01) |
| G06K 9/78 | (2006.01) |

(52) U.S. Cl.
CPC ......... *G06K 9/6202* (2013.01); *G06K 9/4671* (2013.01); *G06K 9/481* (2013.01); *G06K 9/6262* (2013.01); *G06K 9/78* (2013.01)

(58) Field of Classification Search
CPC .. G06K 9/4671; G06K 9/6202; G06K 9/6203; G06K 9/6212; G06K 9/6215; G06K 9/481; G06K 9/78
USPC ........................................................ 382/190
See application file for complete search history.

(56) References Cited

U.S. PATENT DOCUMENTS

| 8,670,619 | B2 | 3/2014 | Funayama | |
| 8,774,498 | B2 | 7/2014 | de Campos | |
| 8,781,232 | B2 | 7/2014 | Huang | |
| 2005/0238198 | A1* | 10/2005 | Brown | G06K 9/4609 382/103 |
| 2009/0316993 | A1* | 12/2009 | Brasnett | G06K 9/4633 382/190 |

(Continued)

FOREIGN PATENT DOCUMENTS

| WO | WO 2012136642 A1 | 10/2012 |
| WO | WO 2013029674 A1 | 7/2013 |

OTHER PUBLICATIONS

E. Rublee, V. Rabaud, K. Konolige, G. Bradski, "ORB: An efficient alternative to SIFT or SURF", Proc. IEEE Int. Conf. Comput. Vision, pp. 2564-2571, Nov. 2011.*

*Primary Examiner* — Brian P. Werner
*Assistant Examiner* — Ian Lemieux
(74) *Attorney, Agent, or Firm* — Frank A. MacKenzie; Bejin Bieneman PLC

(57) ABSTRACT

An image processing system includes a processing device having a memory device for storing computer-executable instructions. The processing device is programmed to define a first descriptor in a first image, generate a mask from the first descriptor, and define a second descriptor in a second image. The processing device is further programmed to compare the first descriptor to the second descriptor to define a first error vector, determine a second error vector by applying a mask, and compute the total error of the second error vector to determine an error between the first descriptor and the second descriptor.

16 Claims, 5 Drawing Sheets

(56) References Cited

U.S. PATENT DOCUMENTS

| | | |
|---|---|---|
| 2013/0243341 A1 | 9/2013 | Iakovenko |
| 2014/0226906 A1 | 8/2014 | Kang |
| 2014/0310314 A1* | 10/2014 | Li .................... G06F 17/30247 |
| | | 707/780 |
| 2016/0148074 A1* | 5/2016 | Jean .................... G06K 9/4671 |
| | | 382/190 |

* cited by examiner

ONLINE PER-FEATURE DESCRIPTOR CUSTOMIZATION

BACKGROUND

Feature descriptors generated by a sequence of two-pixel intensity comparisons are capable of representing image features tersely and quickly. These binary or Boolean string descriptors, which store a comparison's outcome in a single bit, require a small amount of memory per feature, reducing memory footprint and network transfer bandwidth. Computing and matching these descriptors requires less runtime than alternatives like the Scale-Invariant Feature Transform (SIFT) algorithm and the Speeded Up Robust Features (SURF) algorithm, with comparable matching accuracy.

The Binary Robust Independent Elementary Features (BRIEF) method is notable due to its ability to gain runtime improvements through use of vector instructions. Reduction in memory usage and runtime is suited to the needs of high-FPS real-time vision applications.

DETAILED DESCRIPTION

Figure 1:
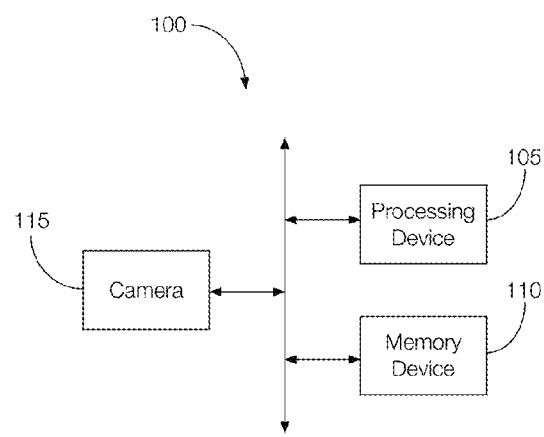
FIG. 1 is a block diagram of an example image processing system for comparing viewpoint changes in images.

BRIEF's comparisons are fixed and do not adapt to the image content of individual features. Consequently, some tests will be sensitive to viewpoint change, as intensity values shifting under the fixed sampling pattern can cause test outcome changes. This can lead to an increased false match rate, as some test results will not be robust.

Learning a unique descriptor structure for every feature in an image at run-time can account for viewpoint change effects. This includes tailoring the image processing for Boolean string descriptors, making this approach suitable for real time systems. An example image processing system that can account for viewpoint changes includes a processing device having a memory device for storing computer-executable instructions. The processing device is programmed to define a first descriptor in a first image, generate a mask from the first image, and define a second descriptor in a second image. The processing device is further programmed to compare the first descriptor to the second descriptor to define a first error vector, apply the mask to the first error vector to determine a second error vector, and count the non-zero entries in the second error vector to determine an error between the first descriptor and the second descriptor.

The proposed system uses an asymmetric division of labor between reference features and query features. A reference feature may be contained in a keyframe or map, while a query feature may be extracted from live imagery. In addition, an asymmetric descriptor representation for reference and query features may be used.

Despite this asymmetry, the runtime for matching with the proposed system can be similar with improvements to precision and recall. Simulating the effect of viewpoint change on reference feature descriptors and defining an appropriate weighting vector to suppress unreliable intensity tests achieves the improvements of precision and recall.

The proposed system implements a process for computing descriptor weighting vectors through synthetic observations of an image patch and provides an efficient distance function for weighted descriptors. Thus, the proposed system includes an extension to BRIEF that allows per-feature customization to robustly describe a feature. This system, referred to herein as TailoredBRIEF, focuses on the descriptor and matching aspects, and operates online as new features are detected.

The BRIEF descriptor summarizes local appearance through intensity tests between pairs of pixels surrounding an image feature. The Boolean outputs of the tests are stored efficiently in memory with one bit each. Stored in this way, the exclusive-or (XOR) and population count (POPCNT) instructions can be used to compute the number of bit errors between two descriptors efficiently, also known as the Hamming Distance. This terse descriptor can be matched relatively quickly, especially when compared to systems such as SURF.

Before computing a BRIEF descriptor, a set of test points must be defined using, e.g., a Gaussian distribution or another parameterized random distribution. Once defined, the same test points may be repeatedly used. Scale invariance may be achieved by resizing the test points' positions according to a feature's scale.

To determine a descriptor for a given feature in accordance with BRIEF, for each pair of scaled test points, both image intensities are looked up relative to the feature's position. If the second intensity is greater, the appropriate bit in the descriptor is set. When computing the error between two descriptors, an error vector is created by differencing the descriptors with the XOR instruction and counting the errors with POPCNT to determine the Hamming Distance.

Feature matching may be achieved by computing feature vector nearest-neighbors in a descriptor space, but can be confounded by image feature appearance changes due to a multitude of effects such as sensor noise, lighting changes, and viewpoint changes. For descriptors composed of two-point intensity comparisons, these viewpoint changes may shift the test points across the image patch and can result in a different outcome for a particular intensity comparison. This can increase the matching error for a true correspondence, which can increase the rate of false matches.

The effect of viewpoint change on the descriptor can be simulated by transforming the test positions and extracting a descriptor on the original image. This corresponds to applying the inverse transformation to the image before descriptor extraction, but is simpler, as the full set of transformed test positions can be cached. The descriptors computed under simulated viewpoint change can then be compared to the original descriptor.

Through online learning, the accuracy of descriptor-based feature matching can be improved. This can be achieved primarily by considering the effect of appearance changes on the consistency of an individual feature descriptor. This may include simulating the outcome of these appearance changes to generate training data, which can in turn used to generate a Boolean-weighting vector referred to as a descriptor mask. This mask may be used repeatedly in the inner loop of the matching process, when the matching error is computed for a specific pair of features.

Intensity tests are not equally reliable. Even for optimized test point positions, some image patch exists for a given pair of test points which will produce different results under a small perturbation. If tests were learned for individual image patch instances, this effect could be minimized.

Unique sets of test points for each reference feature could be used to extract multiple descriptors for each query feature. However, this would increase computation times. An alternative includes extracting a single descriptor for each image feature and learning a weight for each test. Assuming that the tests are independent and produce errors according to a Bernoulli distribution, the probability $p_i$ can be estimated for each test i by sampling viewpoint change parameters and warping the image patch or test points appropriately. The probability of a true match can be computed as a function of the test errors and Bernoulli probabilities. However, this may negate a key property of BRIEF, as it would increase the number of operations required to compute the error between two descriptors. An alternative may include learning a Boolean weighting vector and AND it with the error vector to suppress noisy tests. In this way, the subset of tests that are reliable for a particular image patch can be selected. This Boolean weighting vector can be applied efficiently during matching. The Boolean weights can be stored bit-packed as in the BRIEF descriptor.

Masks could be learned for both sets of features instead of one. However, for many systems, this may be unnecessary. For systems like Visual Odometry and Visual SLAM, reference features may be added only periodically. Taking advantage of this asymmetry, performing extra processing on the reference features may not affect descriptor extraction time for the query features. Additionally, memory usage may increase only for reference features, which require twice the memory, while the memory for query features may remain unchanged.

Training data from which to compute a descriptor mask may be gathered by sampling viewpoint changes from uniform distributions in scale and 3-axis rotation. The full transformation is shown in Equation 1, where R represents a 3D rotation matrix generated from in-plane and out-of-plane rotation terms sampled from zero-mean distributions. The original test point coordinates x and y in the range [−0.5, 0.5] are rotated. The result may be projected as if at unit distance by a camera with focal length s, where s is sampled from a distribution with mean 1.

$$x_p = \begin{bmatrix} x_p \\ y_p \\ w \end{bmatrix} = \begin{bmatrix} s & 0 & 0 \\ 0 & s & 0 \\ 0 & 0 & 1 \end{bmatrix} \cdot \left( R \cdot \begin{bmatrix} x \\ y \\ 0 \end{bmatrix} + \begin{bmatrix} 0 \\ 0 \\ 1 \end{bmatrix} \right) \quad (1)$$

While only a small number of viewpoint change parameters are sampled, other terms such as additive noise could be readily integrated into Equation (1). Other viewpoint change parameterizations may be used.

The transformed test point coordinates $x_p$ may be computed once and stored. Learning the descriptor masks may include: 1) computing all transformed descriptors; 2) comparing the original descriptor to each of the transformed descriptors and computing the number of errors for each test i; 3) estimating the sample probability $p_i$(error) for each test; and 4) if $p_i$(error) is greater than a threshold, reject test i by setting its weight to zero.

Blurring the image before learning the descriptor mask may make a notable difference on the repeatability of tests. The image may be blurred using, e.g., a box filter. Blurring the image does not suppress all sensitivity to viewpoint change and that the benefits of blurring and descriptor mask learning are not exclusive.

The elements shown may take many different forms and include multiple and/or alternate components and facilities. The example components illustrated are not intended to be limiting. Indeed, additional or alternative components and/or implementations may be used.

FIG. 1 is a block diagram of an example image processing system 100 for comparing viewpoint changes in images. As shown, the image processing system 100 includes a processing device 105 and a memory device 110. The memory device 110 may include an electronic device with volatile or non-volatile media for storing computer-executable instructions. The processing device 105 may include any electronic device configured and programmed to access and execute computer-executable instructions stored in the memory device 110. The instructions may include instructions associated with processing images captured by a camera 115, which may or may not be incorporated into the image processing system 100. The camera 115 may include any image capture device configured to capture various (e.g., sequential) images from, e.g., different viewpoints relative to a reference image. The different viewpoints may include a view of an object in the reference image but from a different distance or angle. Thus, the object may be scaled or rotated relative to the same object depicted in the reference image. As discussed above, different viewpoints may be defined according to pitch, raw, etc., relative to the reference image.

In accordance with the description of the TailoredBRIEF image processing system 100, the processing device 105 may be programmed to receive the first image captured by the camera 115. An example "first image" or "reference image" is shown and described below with reference to FIG. 2A. As discussed above, the processing device 105 may be programmed to blur the first image. Blurring the first image may include, e.g., applying a box filter technique to the first image. The processing device 105 may be programmed to define a first descriptor from the blurred or original version of the first image. The first descriptor may include a plurality of first test points as shown and described with reference to FIG. 2B, below.

With the first descriptor, the processing device 105 may be programmed to generate a mask, as previously described. The mask may permit a subset of the plurality of first test points. The subset may include, e.g., those test points likely to be robust. Thus, the processing device 105 may be programmed to test the plurality of the first test points for robustness and generate a mask to suppress non-robust test points. The mask may include a bit value for each of the test points. The bit value of the test points to permit via the mask may include, e.g., a bit value of 1.

The processing device 105 may further be programmed to receive a second image. As discussed above, the second image may represent a viewpoint change of the camera 115 relative to the object represented in the first image. Like with the first image, the processing device 105 may be programmed to blur the second image and define a second descriptor based on the blurred version of the second image. Blurring the second image may include, e.g., applying a box filter technique to the second image. The processing device 105 may be programmed to define the second descriptor from the blurred or original version of the second image. The second descriptor may include a plurality of second test points.

The processing device 105 may then define a first error vector. Defining the first error vector may include comparing the first descriptor to the second descriptor. For instance, the processing device 105 may be programmed to apply an exclusive OR (XOR) operation to the first descriptor and the second descriptor. To determine a second error vector that, e.g., suppresses errors in the first error vector, the processing device 105 may be programmed apply an AND operation to the mask and the first error vector. The processing device 105 may be further programmed to identify an error between the first descriptor and the second descriptor. One way to compute this error may include, e.g., applying a popcount (POPCNT) operation to the second error vector.

Figure 2A:
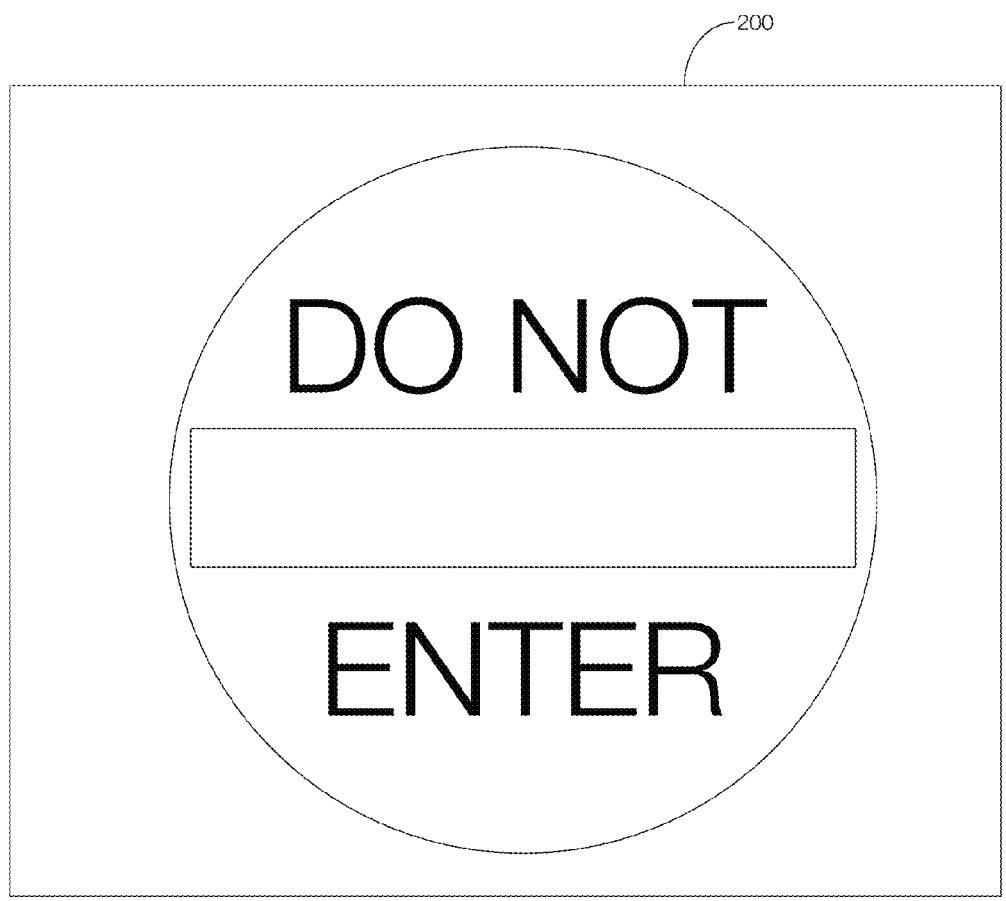
FIG. 2A illustrates an example image processed by the processing system of FIG. 1.
Figure 2B:
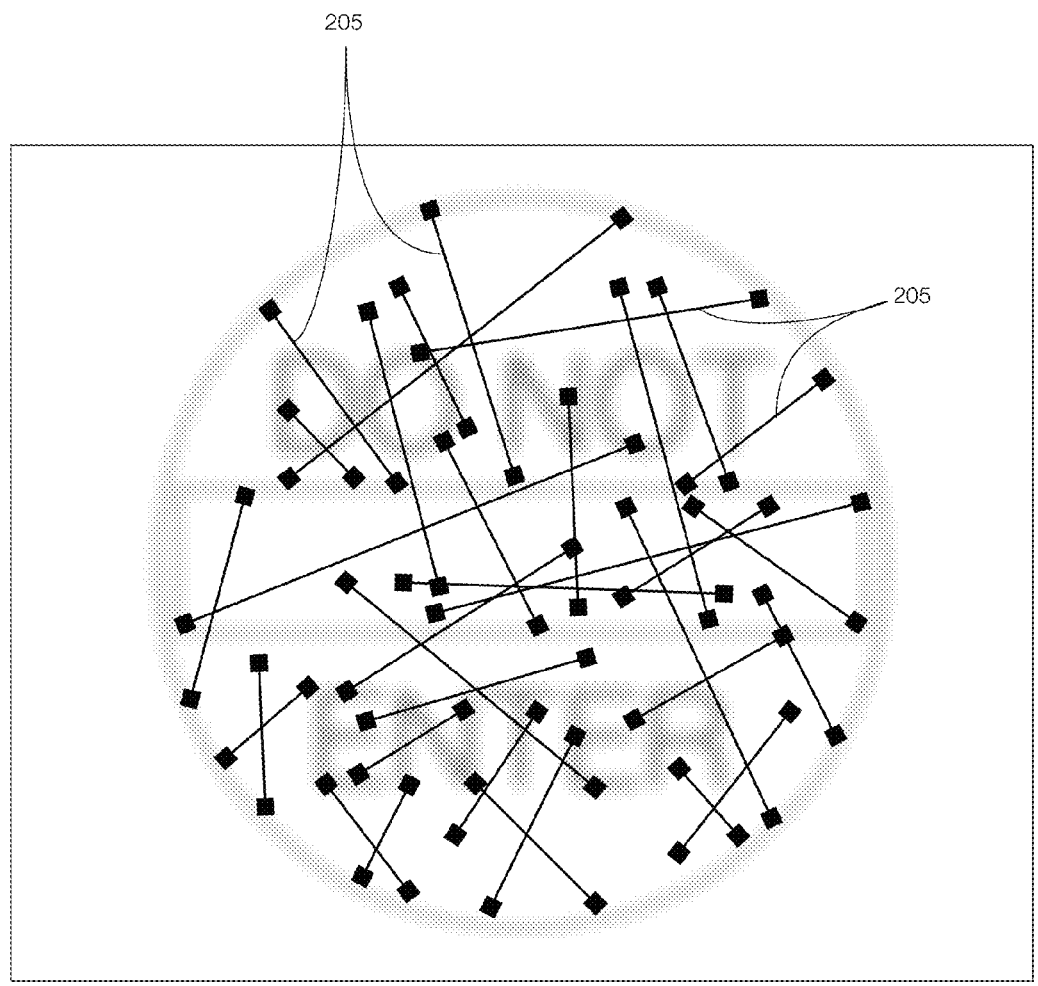
FIG. 2B illustrates an example first descriptor, having a plurality of first test points, associated with the example image of FIG. 2A after blurring.
Figure 2C:
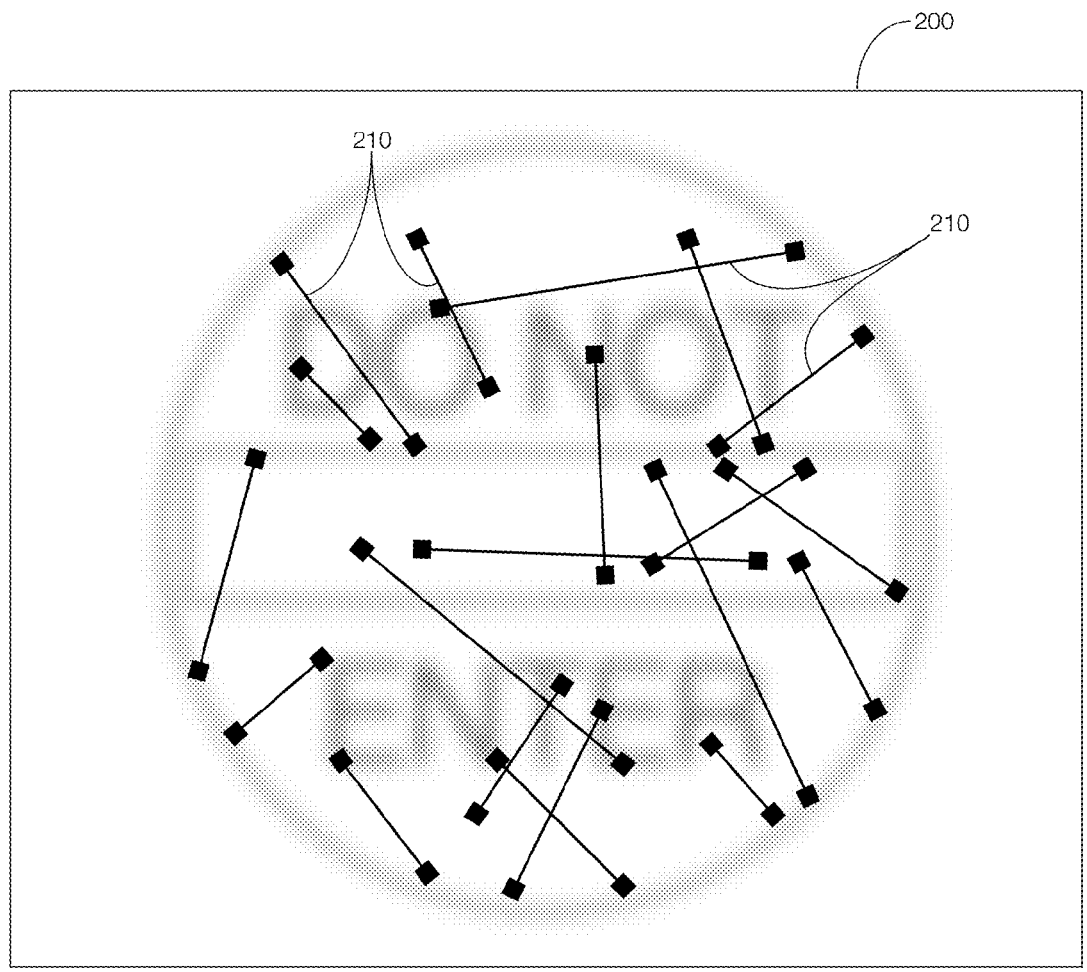
FIG. 2C illustrates an example masked descriptor including a subset of the first test points, the mask generated from the first descriptor shown in the example image of FIG. 2B after blurring.
Figure 2D:
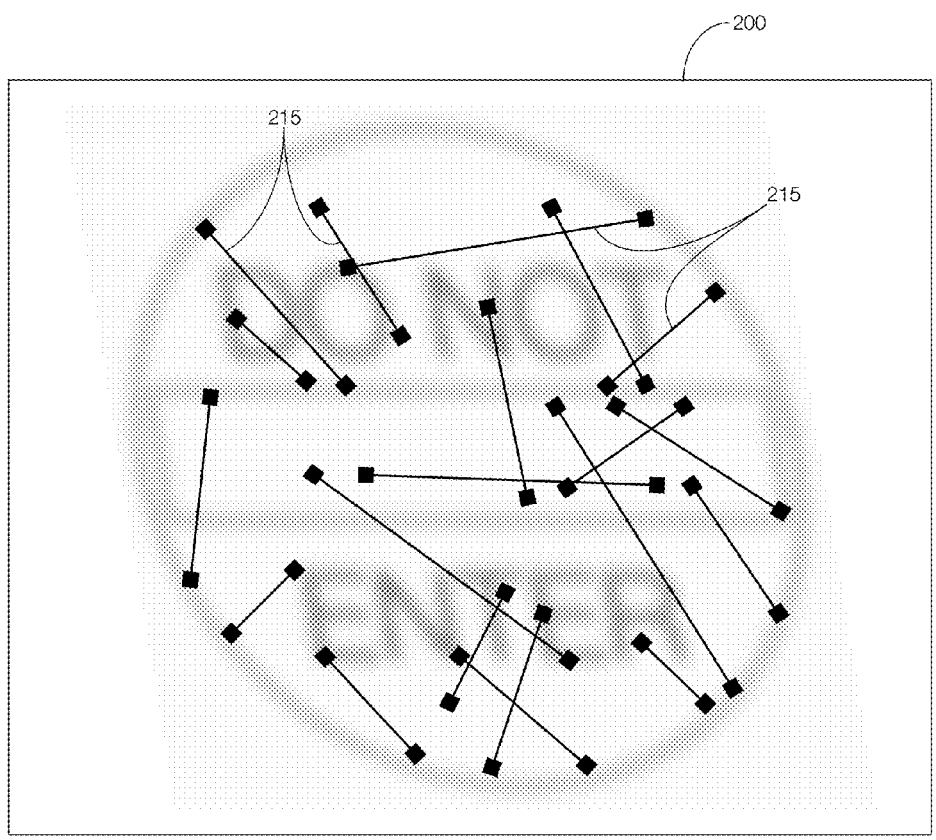
FIG. 2D illustrates an example second descriptor, having a plurality of second test points, associated with the example image of FIG. 2A from a different viewpoint after blurring.

FIGS. 2A-2D show example relationships between the first and second descriptors that may be determined by the processing device 105. FIG. 2A illustrates an example image 200 that may be processed by the image processing system 100 described with reference to FIG. 1. Now referring to FIG. 2B, the image 200 may be blurred and the first descriptor, represented by the lines 205, may be determined using the techniques previously described. For purposes of simplicity, only a few of the lines 205 representing the first descriptor are labeled in FIG. 2B. FIG. 2C illustrates a masked descriptor 210 that may be generated from the first descriptor 205 shown with reference to FIG. 2B. For purposes of simplicity, only a few of the lines 210 representing the masked descriptor are labeled in FIG. 2C. FIG. 2D illustrates an example second descriptor, shown by the lines 215, associated with the example image of FIG. 2A as if computed from a different viewpoint. For purposes of simplicity, only a few of the lines 215 representing the second descriptor are labeled in FIG. 2D. As previously explained, the processing device 105 can determine the first and second error vectors from the first descriptor, the second descriptor, and the mask illustrated by FIGS. 2B-2D.

Figure 3:
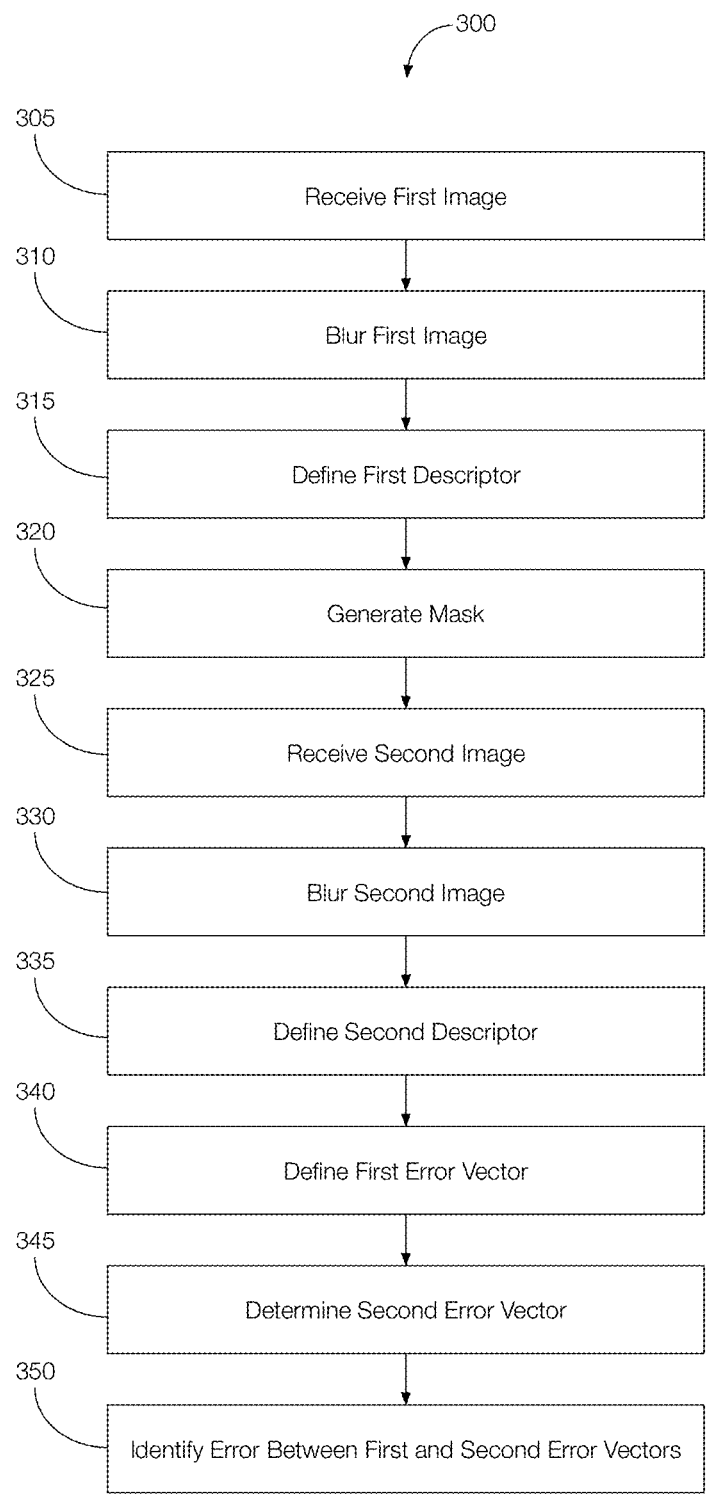
FIG. 3 is a flowchart of an example process that may be executed by the image processing system.

FIG. 3 is a flowchart of an example process 300 that may be executed by the image processing system 100. For instance, the process 300 may be executed by the processing device 105 to, e.g., evaluate images captured by the camera 115. The images may represent a common object but from different viewpoints.

At block 305, the image processing system 100 may receive a first image. The first image may include, e.g., an image of an object captured by the camera 115. The first image may also be referred to as the "reference image." The first image may be received by, e.g., the processing device 105.

At block 310, the image processing system 100 may blur the first image. The processing device 105 may, for instance, blur the first image by applying a box filter technique to the first image.

At block 315, the image processing system 100 may define the first descriptor associated with the first image. In one possible approach, the processing device 105 may define the first descriptor from the blurred or original version of the first image. The first descriptor may include a plurality of first test points.

At block 320, the image processing system 100 may generate a mask. In one possible implementation, the processing device 105 may generate the mask to permit, e.g., a subset of the test points in the first descriptor. The processing device 105 may generate the mask to include those test points likely to be the most robust. For instance, the processing device 105 may test the first test points for robustness to viewpoint change and filter unreliable test points (i.e., test points with an error rate above a predetermined threshold). Any remaining test points (i.e., the most reliable test points) may be the test points used to generate the mask. The mask may include a bit value for each of the test points. The bit value of the test points to permit via the mask may include, e.g., a bit value of 1.

At block 325, the image processing system 100 may receive a second image. For instance, the processing device 105 may receive the second image from the camera 115. The second image may represent a viewpoint change of the camera 115 relative to the content represented in the first image.

At block 330, the image processing system 100 may blur the second image. The processing device 105 may, in one possible approach, blur the second image by applying a box filter technique to the second image.

At block 335, the image processing system 100 may define a second descriptor based on the blurred or original version of the second image. The second descriptor may be defined by the processing device 105 according to a plurality of second test points.

At block 340, the image processing system 100 may determine the first error vector from the first and second descriptors. Defining the first error vector may include the processing device 105 comparing the first descriptor to the second descriptor. For instance, the processing device 105 may apply an exclusive OR (XOR) operation to the first description and the second description.

At block 345, the image processing system 100 may determine the second error vector (i.e., a mask error vector) that, e.g., suppresses errors in the first error vector. To determine the second error vector, the processing device 105 may apply an AND operation to the mask and the first error vector.

At block 350, the image processing system 100 may identify an error value from the second error vector to, e.g., identify an error between the first and second descriptors. For instance, the processing device 105 may apply a popcount (POPCNT) operation to the second error vector.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An image processing system comprising:
a processor having a memory storing computer-executable instructions, wherein the processor is programmed to:
define a first descriptor in a first image;
generate a mask from the first image;
define a second descriptor in a second image, wherein the first descriptor includes a plurality of first test points and wherein the second descriptor includes a plurality of second test points;
compare the first descriptor to the second descriptor to define a first error vector;
determine a second error vector by applying the mask, wherein the mask reduces the plurality of first test points to a subset of the plurality of first test points based at least in part on a robustness to viewpoint change of each of the plurality of first test points; and
determine an error between the first descriptor and the second descriptor using the second error vector.

2. The image processing system of claim 1, wherein the processor is programmed to blur the first image before defining the first descriptor and blur the second image before defining the second descriptor.

3. The image processing system of claim 1, wherein the mask includes a bit value for each of the subset of the plurality of first test points, and wherein each bit value defines the robustness of each of the subject of the plurality of first test points.

4. The image processing system of claim 1, wherein generating the mask includes:

testing the plurality of first test points for robustness to viewpoint change;
identifying certain test points of the plurality of first test points as unreliable test points as a result of testing the plurality of first test points for robustness;
suppressing the unreliable test points from the plurality of first test points.

5. The image processing system of claim 1, wherein comparing the first descriptor to the second descriptor includes applying an exclusive OR (XOR) operation to the first descriptor and the second descriptor.

6. The image processing system of claim 1, wherein the second error vector is determined as a result of applying an AND operation to the mask and the first error vector.

7. The image processing system of claim 6, wherein applying the AND operation suppresses errors in the first error vector.

8. The image processing system of claim 1, wherein comparing the first descriptor to the second descriptor includes applying a popcount (POPCNT) operation to the second error vector, and wherein the error between the first descriptor and the second descriptor is determined as a result of applying the popcount operation to the second error vector.

9. The image processing system of claim 1, further comprising a camera configured to capture the first image and the second image, wherein the second image represents a viewpoint change of the camera relative to the first image.

10. The image processing system of claim 9, wherein the first image is used to generate a plurality of descriptors and masks, and the second image is used to generate a plurality of descriptors, and wherein the descriptors and masks generated from the first image are compared to descriptors determined from a plurality of subsequent images.

11. A method comprising
defining a first descriptor in a first image;
generating a mask from the first descriptor;
defining a second descriptor in a second image, wherein the first descriptor includes a plurality of first test points and wherein the second descriptor includes a plurality of second test points;
comparing the first descriptor to the second descriptor to define a first error vector;
determining a second error vector by applying a mask, wherein the mask reduces the plurality of first test points to a subset of the plurality of first test points based at least in part on a robustness to viewpoint change of each of the plurality of first test points; and
determining an error between the first descriptor and the second descriptor from the second error vector.

12. The method of claim 11, further comprising:
blurring the first image before defining the first descriptor; and
blurring the second image before defining the second descriptor.

13. The method of claim 11, wherein generating the mask includes:
testing the plurality of first test points for robustness to viewpoint change;
identifying certain test points of the plurality of first test points as unreliable test points as a result of testing the plurality of first test points for robustness; and
filtering the unreliable test points from the plurality of first test points.

14. The method of claim 11, wherein comparing the first descriptor to the second descriptor includes applying an exclusive OR (XOR) operation to the first descriptor and the second descriptor.

15. The method of claim 11, wherein determining the second error vector includes determining the second error vector as a result of applying an AND operation to the mask and the first error vector to suppress errors in the first error vector.

16. The method of claim 11, wherein comparing the first descriptor to the second descriptor includes applying a popcount (POPCNT) operation to the second error vector, and wherein the error between the first descriptor and the second descriptor is determined as a result of applying the popcount operation to the second error vector.

* * * * *